(12) United States Patent
Manger et al.

(10) Patent No.: US 11,920,977 B2
(45) Date of Patent: Mar. 5, 2024

(54) METROLOGY SYSTEM AND METHOD FOR MEASURING AN EXCITATION LASER BEAM IN AN EUV PLASMA SOURCE

(71) Applicant: Carl Zeiss SMT GmbH, Oberkochen (DE)

(72) Inventors: Matthias Manger, Aalen-Unterkochen (DE); Florian Baumer, Oberkochen (DE)

(73) Assignee: Carl Zeiss SMT GmbH, Oberkochen (DE)

(*) Notice: Subject to any disclaimer, the term of this patent is extended or adjusted under 35 U.S.C. 154(b) by 521 days.

(21) Appl. No.: 17/192,012

(22) Filed: Mar. 4, 2021

(65) Prior Publication Data

US 2021/0190583 A1 Jun. 24, 2021

Related U.S. Application Data

(63) Continuation of application No. PCT/EP2019/071801, filed on Aug. 14, 2019.

(30) Foreign Application Priority Data

Oct. 2, 2018 (DE) .......................... 102018124396.0

(51) Int. Cl.
*G01J 1/42* (2006.01)
*G01J 1/04* (2006.01)
*H05G 2/00* (2006.01)

(52) U.S. Cl.
CPC ........... *G01J 1/4257* (2013.01); *G01J 1/0418* (2013.01); *H05G 2/008* (2013.01)

(58) Field of Classification Search
CPC .................. G01J 1/4257; G01J 1/0418; G01J 2009/0219; G01J 2009/0234; G01J 9/0215; H05G 2/008
See application file for complete search history.

(56) References Cited

U.S. PATENT DOCUMENTS

4,518,854 A * 5/1985 Hutchin .................... G01J 9/00
356/521
8,004,690 B2 * 8/2011 Wegmann ........... G03F 7/70483
356/521

(Continued)

FOREIGN PATENT DOCUMENTS

| CN | 103335731 A | 10/2013 |
|---|---|---|
| DE | 10 2012 212 354 A1 | 1/2014 |

(Continued)

OTHER PUBLICATIONS

International Search Report, with translation, for corresponding PCT Appl. No. PCT/EP2019/071801, dated Dec. 5, 2019.

(Continued)

*Primary Examiner* — David A Vanore
(74) *Attorney, Agent, or Firm* — Fish & Richardson P.C.

(57) ABSTRACT

A metrology system includes a first beam analysis system for analyzing at least one first measurement beam that was coupled from the excitation laser beam before a reflection on the target material and a second beam analysis system for analyzing at least one second measurement beam that was coupled from the excitation laser beam after a reflection on the target material. Each of the first beam analysis system and the second beam analysis system has at least one wavefront sensor system.

17 Claims, 10 Drawing Sheets

(56) References Cited

U.S. PATENT DOCUMENTS

| | | | |
|---|---|---|---|
| 8,134,716 B2 * | 3/2012 | Emer | G03F 7/706 356/520 |
| 10,048,199 B1 | 8/2018 | Odle et al. | |
| 2010/0044591 A1 | 2/2010 | Loopstra et al. | |
| 2012/0093993 A1 * | 4/2012 | Bortone | A23L 7/197 426/456 |
| 2013/0119232 A1 * | 5/2013 | Moriya | H05G 2/006 250/493.1 |
| 2013/0271749 A1 * | 10/2013 | Korb | G03F 7/7085 356/124 |
| 2014/0191108 A1 | 7/2014 | Moriya et al. | |
| 2016/0334711 A1 * | 11/2016 | Eurlings | H05G 2/005 |
| 2017/0122803 A1 * | 5/2017 | Manger | G01J 1/4257 |
| 2018/0299782 A1 * | 10/2018 | Wegmann | G01M 11/0271 |
| 2020/0003655 A1 * | 1/2020 | Ehrmann | G01M 11/0264 |
| 2021/0190583 A1 * | 6/2021 | Manger | G01J 1/0418 |

FOREIGN PATENT DOCUMENTS

| | | |
|---|---|---|
| DE | 10 2014 208 792 A1 | 11/2015 |
| DE | 10 2015 226 571 A1 | 6/2017 |
| DE | 10 2018 124 356 A1 | 9/2019 |
| DE | 102018124356 A1 * | 9/2019 |
| EP | 3359928 B9 * | 5/2021 ........... B23K 26/032 |
| JP | 2010-045354 | 2/2010 |
| JP | 2013-105725 | 5/2013 |
| JP | 2017-519222 | 7/2017 |
| WO | WO 2017/108349 A1 | 6/2017 |

OTHER PUBLICATIONS

JP-Office Action, with translation thereof, for corresponding JP Appl No. 2021-518518 dated Jul. 3, 2023.
IPRP for corresponding Appl No. PCT/EP2019/071801 dated Mar. 23, 2021.
Mitsuo Takeda, Hideki Ina, and Seiji Kobayashi: "Fourier-transform method of fringe-pattern analysis for computer-based topography and interferometry", Journal of the Optical Society of America, vol. 72, No. 1/Jan. 1982, pp. 156-160.
GPTO-Office Action, with translation thereof, for corresponding DE Appl No. 10 2018 124 396.0 dated Jun. 24, 2019.

* cited by examiner

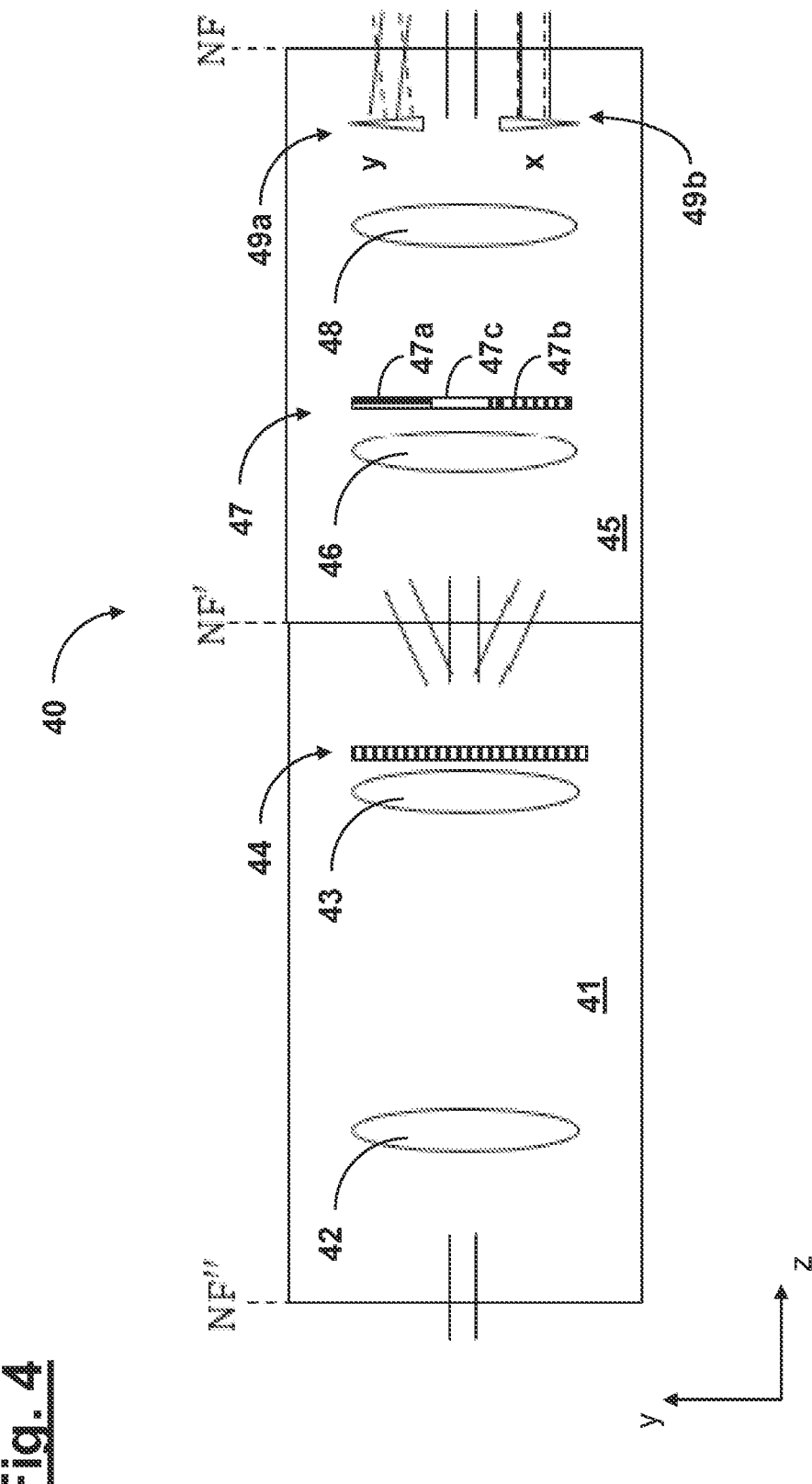

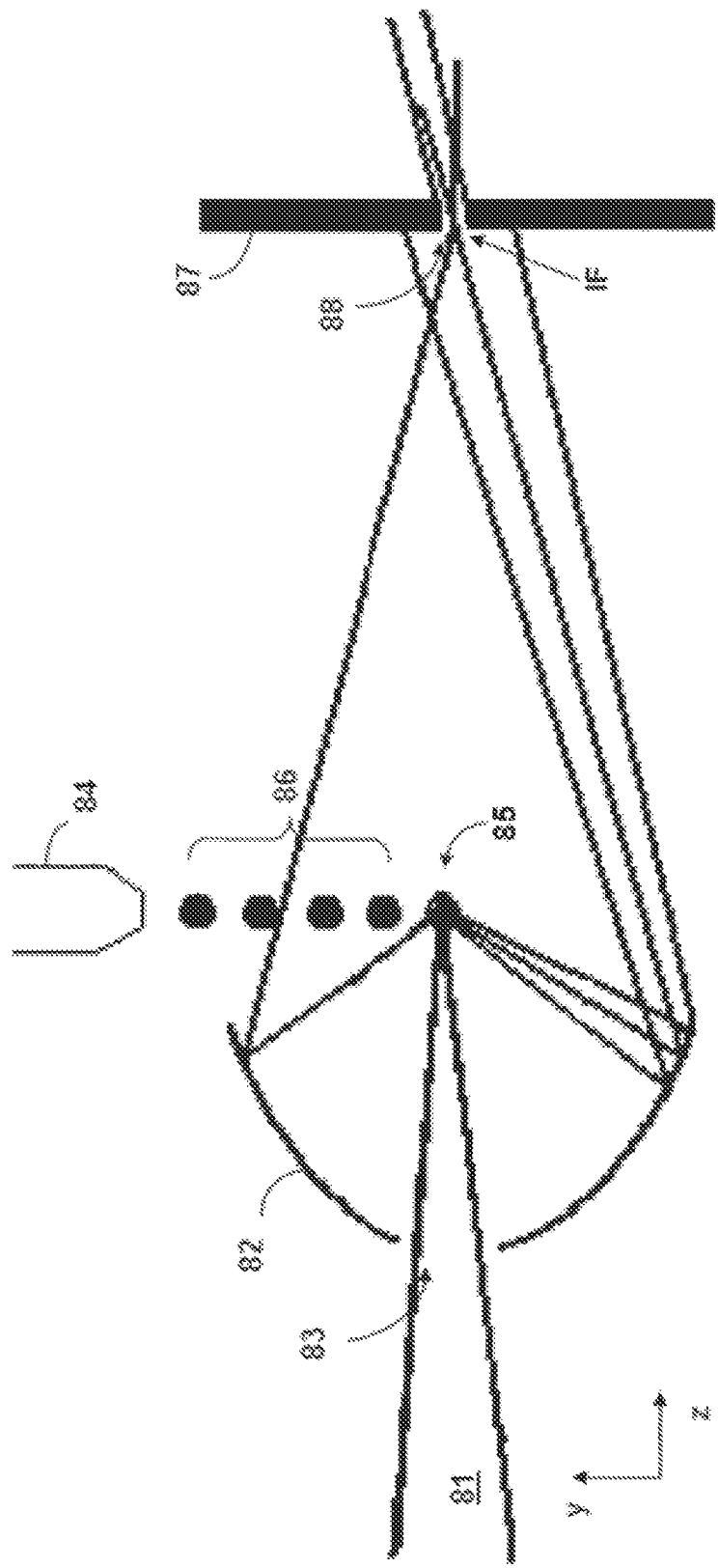

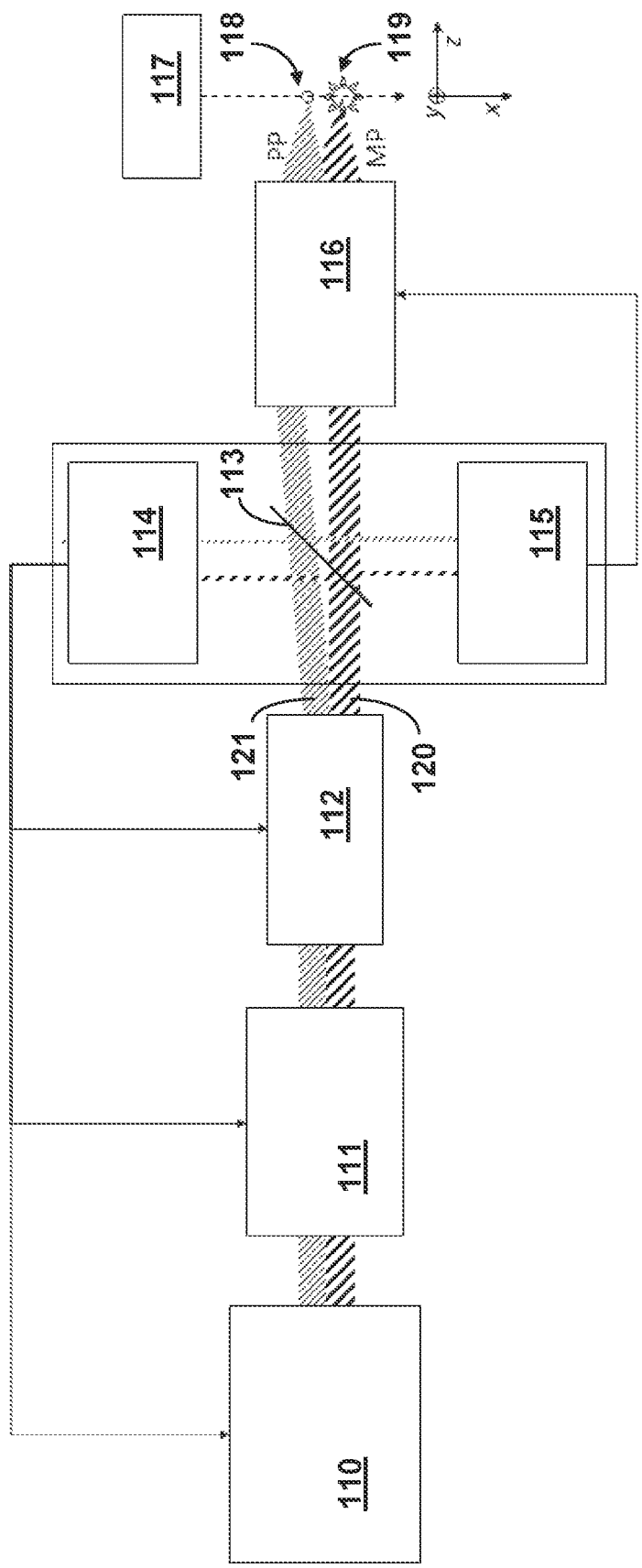

METROLOGY SYSTEM AND METHOD FOR MEASURING AN EXCITATION LASER BEAM IN AN EUV PLASMA SOURCE

CROSS-REFERENCE TO RELATED APPLICATIONS

The present application is a continuation of, and claims benefit under 35 USC 120 to, international application PCT/EP2019/071801, filed Aug. 14, 2019, which claims benefit under 35 USC 119 of German Application No. 10 2018 124 396.0, filed on Oct. 2, 2018. The entire disclosure of these applications are incorporated by reference herein.

FIELD

The disclosure relates to a metrology system and a method for measuring an excitation laser beam in an EUV plasma source.

BACKGROUND

By way of example, laser plasma sources are used in lithography. Thus, for example, the EUV light is generated via an EUV light source based on a plasma excitation, with respect to which FIG. 9 shows an exemplary conventional setup, during the operation of a projection exposure apparatus configured for the EUV range (e.g. at wavelengths of e.g. approximately 13 nm or approximately 7 nm).

This EUV light source includes a high-energy laser (not shown here), for example for generating infrared radiation 81 (e.g., $CO_2$ laser with a wavelength of $\lambda \approx 10.6$ μm), the infrared radiation being focused by way of a focusing optical unit, passing through an opening 83 present in a collector mirror 82 embodied as an ellipsoid and, as an excitation beam, being steered at a target material 86 (e.g., tin droplets) which is generated via a target source 84 and supplied to a plasma ignition position 85. The infrared radiation 81 heats the target material 86 situated in the plasma ignition position 85 in such a way that the target material transitions into a plasma state and emits EUV radiation. This EUV radiation is focused by way of the collector mirror 82 onto an intermediate focus IF and enters through the latter into a downstream illumination device, the edge 87 of which is merely indicated and which has a free opening 88 for the light entrance. What can be of substantial importance for the dose stability or time stability of the EUV emission characteristic achievable in an EUV plasma source and for the realizable EUV luminous efficiency is that the tin droplets "flying into" the laser plasma source very quickly (e.g., with an injection rate in the region of 100 kHz or with a time interval of, e.g., 10 μs) with increasing desired light properties are hit individually in a highly precise (e.g. with an accuracy of more than 1 μm) and reproducible manner by the laser beam atomizing the droplet. In the aforementioned setup, this in turn can involve highly accurate setting of the droplet position and highly accurate tracking of the infrared radiation generated by, e.g., the $CO_2$ laser.

To increase EUV conversion efficiency, the target material can be converted into the plasma in two steps. In this case, the respective target droplet is initially suitably conditioned by way of a preconditioning laser beam at a first wavelength (of, e.g., approximately 10.3 μm) in order subsequently to be completely converted into plasma by the so-called main pulse of the excitation laser beam at a second wavelength (of, e.g., approximately 10.6 μm) under a high EUV conversion efficiency. On account of the two-stage process of the conversion to the plasma, it can be desirable to capture by measurement two laser beams and the radiation thereof backscattered from the target in order to control the geometric relationships between beam and beam or beam and target.

FIG. 10 shows a schematic illustration of a corresponding conventional arrangement for controlling the beam in an EUV plasma source. In this case, analyzing the excitation laser beam or a measurement beam coupled therefrom both in the "forward direction" (i.e., prior to the incidence at the respective target droplet) and in the "backward direction" (i.e., following a reflection at the respective target droplet) allows a statement to be made about the relative settings of excitation laser beam or preconditioning laser beam and target droplet to one another.

According to FIG. 10, the laser beam generated by a $CO_2$ laser 110 is fed via a beam control unit 111, a pulse separation unit 112, a beam splitter 113 and a focusing optical unit 116 to the target material fed from a target source 114. Excitation laser beam 120 and preconditioning laser beam 121 are separated from one another in the wavelength-selective pulse separation unit 112, with the preconditioning laser beam 121 being focused on a target droplet 118 that has not yet been conditioned and the excitation laser beam 120 being focused on a correspondingly conditioned target droplet 119. Some of the excitation laser beam 120 and some of the preconditioning laser beam 121 is in each case reflected back from the respective target droplet and returns to the beam splitter 113 in collimated fashion by the focusing optical unit 116. Measurement beams from both the excitation laser beam 120 and the preconditioning laser beam 121 are respectively output coupled by the beam splitter 113, both "in the forward direction" (i.e., prior to the incidence of the excitation laser beam at the target material) and "in the backward direction" (i.e., following a reflection at the target material). The output-coupled measurement beams each enter a beam analysis system 114 or 115 which, in accordance with FIG. 10, transmits control signals for active beam control to the $CO_2$ laser 110, the beam control unit 111 and the pulse separation unit 112 in accordance with the measured beam properties. Moreover, the beam analysis system 115 transmits a control signal for controlling the focus to the focusing optical unit 116.

Regarding known information, reference is made by way of example to DE 10 2012 212 354 A1.

SUMMARY

The disclosure seeks to provide a metrology system and a method for measuring an excitation laser beam in an EUV plasma source, which facilitate a light beam analysis that is as exact and comprehensive as possible.

In a general aspect, the disclosure provides a metrology system for measuring an excitation laser beam in an EUV plasma source, wherein the excitation laser beam is guided in the EUV plasma source from an excitation laser via a beam control unit and a focusing optical unit to a target material situated in a plasma ignition position, includes:

a first beam analysis system for analyzing at least one first measurement beam that was coupled from the excitation laser beam before a reflection on the target material;

a second beam analysis system for analyzing at least one second measurement beam that was coupled from the excitation laser beam after a reflection on the target material;

wherein both the first beam analysis system and the second beam analysis system each have at least one wavefront sensor system.

The disclosure involves the concept of, within an EUV plasma source, obtaining the information about the beam parameters of the excitation laser beam, for beam control, on the basis of the wavefront measurement both in the forward direction (i.e., prior to the incidence on the respective target droplet) and in the backward direction (i.e., after reflection at the respective target droplet). The disclosure involves the idea that, in the case of the (reduced-size) imaging of the output-coupled measurement beam implemented in each case by way of a telescope arrangement, the complete reconstruction of the (object-side) beam properties in a beam analysis system can be obtained via a wavefront sensor system, which captures the beam properties in an image-side near field plane provided by the telescope arrangement, and an additionally recorded near field image.

"Near field" denotes both here and below the amplitude/intensity distribution in a sectional plane perpendicular to the direction of propagation in the regime of the collimated (expanded=virtually divergence-free) beam. The far field, by contrast, corresponds to the amplitude/intensity distribution in a plane near the waist, or near the focus, perpendicular to the beam propagation in the regime of the focused or convergent beam. The generation of a focused beam from the collimated beam, and vice versa, is usually carried out via Fourier optical units. The terms "near field plane" and "far field plane" denote Fourier-conjugated planes and are used here analogously to the terms "pupil plane" and "field plane", respectively, of an imaging optical system.

The disclosure also involves the further concept of additionally designing the relevant beam analysis systems for analyzing the measurement beam coupled from the excitation laser beam before or after a reflection on the target material also for analyzing a preconditioning laser beam which, as already mentioned at the outset, serves to initially suitably condition the respective target droplet for the purposes of increasing the EUV conversion efficiency during the conversion into the plasma by way of the actual main pulse. In this configuration of the beam analysis systems according to the disclosure, it can consequently be possible to realize a complete capture by measurement of the laser beams (excitation laser beam and preconditioning laser beam) used during the two-stage process for efficient ignition of the plasma and of the associated reflection radiation from the target purely on the basis of the wavefront sensor system used according to the disclosure.

In this context and in various configurations of the disclosure, the two beam analysis systems used to analyze the aforementioned laser beams in the forward direction and in the backward direction can each be of the same design, as a result of which it is possible to minimize the outlay, both from a manufacturing point of view and with respect to the evaluation of the respective measurement result.

As of matter of principle, three designs or categories can be distinguished with respect to the design of the wavefront sensor system or the measurement principle underlying the wavefront measurement.

In the case of the "externally referenced interferometric wavefront measurement", the wavefront measurement is implemented by comparing the wavefront to be measured to a (typically spherical or plane) reference wave, wherein the known point diffraction interferometer can be cited as an example. In the case of the "self-referenced interferometric wavefront measurement", the wavefront measurement is implemented by superposing the wavefront to be measured on a wavefront generated by replication, wherein the grating shearing interferometer can be specified as an example. A third category is formed by the wavefront measurement by measuring the local wavefront inclination, wherein the local wavefront curvature is measured (e.g., using Shack-Hartmann sensors) at positions defined by small subapertures in comparison with the beam size.

In some embodiments of the disclosure (without, however, the disclosure being restricted thereto), the wavefront sensor system of the beam analysis systems used in the forward direction and in the backward direction respectively have a grating shearing interferometer. For example, this grating shearing interferometer can be a far field grating shearing interferometer. This configuration, which is described in more detail below, inter alia has as a consequence that the diffraction grating used for the shearing or the generation of the respective shearing interferograms can be configured to be comparatively coarse (with grating constants of the order of 1 mm in the case of wavelengths around 10 μm). Moreover, wavefront curvature that acts as a modulation carrier can be generated in this configuration by way of detuning a Kepler telescope, within which the relevant diffraction grating is arranged.

In certain embodiments of the disclosure, the grating shearing interferometers used in the forward and backward direction in the beam analysis systems can also be near field grating shearing interferometers. As is yet to be explained below, a reduction in the installation size can typically be achieved in this configuration as a consequence of smaller lens diameters within the respective optical units (including beam replication units).

According to some embodiments, the grating shearing interferometer respectively includes a beam replication unit having a first diffraction grating and a second diffraction grating acting as a shearing grating.

According to some embodiments, the second diffraction grating is embodied to generate shearing interferograms in mutually perpendicular directions on a downstream detector.

According to some embodiments, the second diffraction grating further has a transparent region for generating a near field image on a downstream detector.

According to some embodiments, in addition to the excitation laser beam, a preconditioning laser beam is guided to the target material before the plasma ignition position is reached, wherein the first beam analysis system and the second beam analysis system are further designed to analyze this preconditioning laser beam.

According to some embodiments, the wavefront sensor system of the first beam analysis system and the wavefront sensor system of the second beam analysis system each have a beam replication unit with wavelength filters disposed downstream thereof for separating the excitation laser beam and the preconditioning laser beam from one another.

According to some embodiments, the wavefront sensor system of the first beam analysis system and the wavefront sensor system of the second beam analysis system each have a single detector for capturing both the excitation laser beam and the preconditioning laser beam. For example, one and the same detector or image sensor can be used to capture the shearing interferograms respectively recorded in mutually perpendicular directions for both the excitation laser beam and the preconditioning laser beam and also a respectively recorded near field image such that measurement and evaluation errors accompanying the use of different optical components in the respective beam guides are avoided.

According to some embodiments, the excitation laser beam has a wavelength in the infrared range.

In a general aspect, the disclosure provides a method for measuring an excitation laser beam in an EUV plasma source, for example in a metrology system with the above-described features, wherein the excitation laser beam is guided in the EUV plasma source from an excitation laser via a beam control unit and a focusing optical unit to a target material situated in a plasma ignition position, wherein at least one measurement beam is coupled from the excitation laser beam and fed to a beam analysis system; and wherein a wavefront measurement is implemented both for a first measurement beam coupled from the excitation laser beam prior to the reflection at the target material and for a second measurement beam coupled from the excitation laser beam after the reflection at the target material.

Further configurations of the disclosure can be gathered from the description and the claims.

BRIEF DESCRIPTION OF THE DRAWINGS

The disclosure is explained in greater detail below on the basis of exemplary embodiments illustrated in the accompanying figures, in which:

FIGS. 4-6 show schematic illustrations explaining setup and functionality of a grating shearing interferometer in the form of a far field grating shearing interferometer, as used in a beam analysis system according to the disclosure;

FIG. 9 shows a schematic illustration of the basic setup of an EUV light source as per the prior art; and FIG. 10 shows a schematic illustration of a conventional arrangement for controlling the beam in an EUV plasma source.

EXEMPLARY EMBODIMENTS

A basic overall setup of the beam analysis according to the disclosure is initially explained below with reference to FIG. 1. In this case, proceeding from the basic setup of an EUV plasma source or of a metrology system, which has already been described on the basis of FIGS. 9-10, the analysis for a measurement beam respectively coupled from the excitation laser beam is implemented both for the measurement beam output coupled in the "forward direction" (i.e., prior to the incidence of the excitation laser beam on the target material) and for the measurement beam output coupled in the "backward direction" (i.e., following reflection at the target material).

Figure 1:
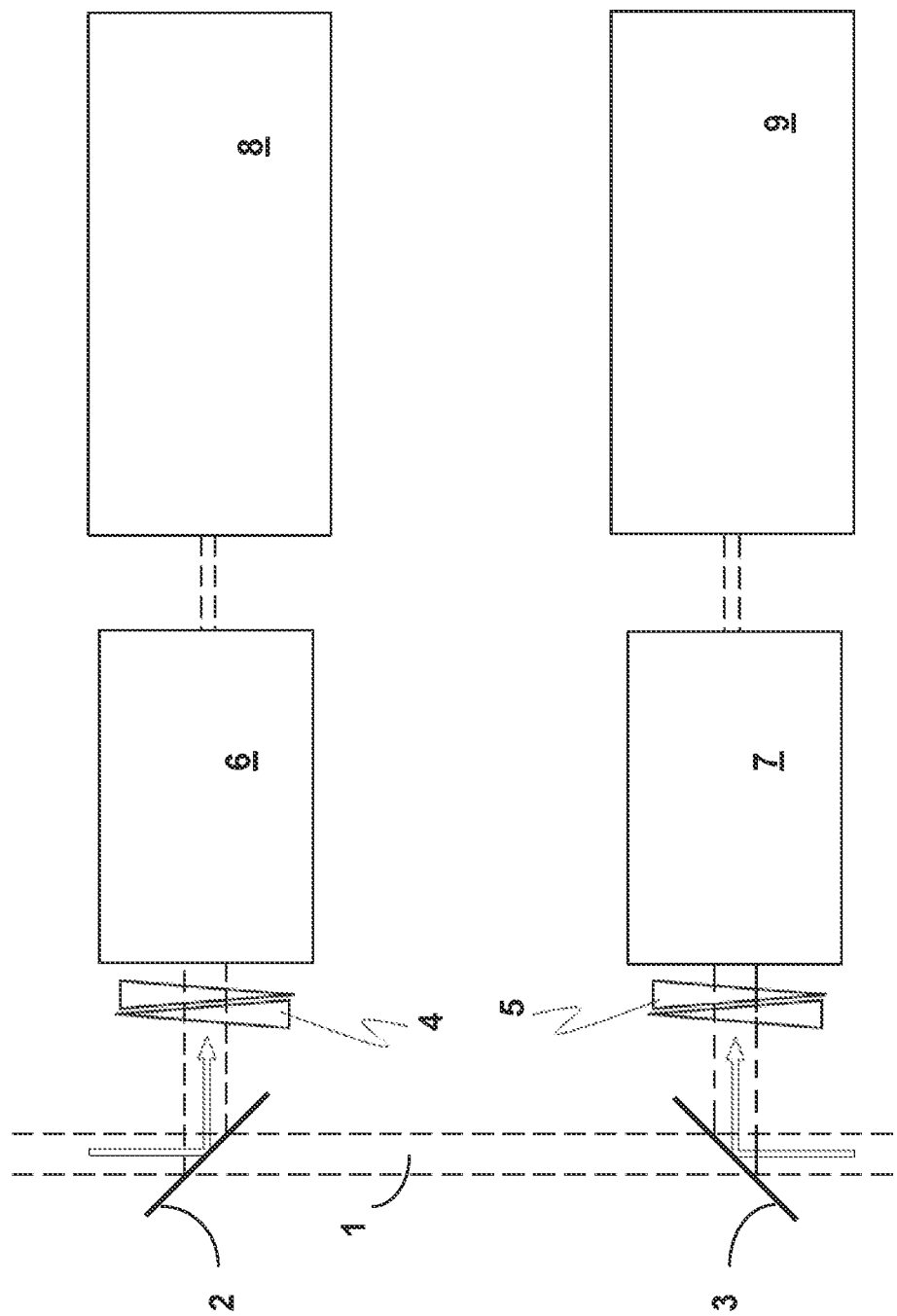
FIG. 1 shows a schematic illustration for explaining the basic overall setup of the beam analysis within a metrology system according to the disclosure, both for a measurement beam output coupled "in the forward direction" (i.e., prior to the incidence of the excitation laser beam on the target material) and for a measurement beam output coupled "in the backward direction" (i.e., after a reflection at the target material)

According to FIG. 1, a measurement beam is respectively output coupled in the forward direction and in the backward direction from the actual excitation laser beam 1 (which extends between a $CO_2$ laser, not plotted, which is situated at the top in FIG. 1 and a target material, likewise not plotted, which is situated bottom left) at beam splitters 2 and 3 in the configuration merely illustrated in exemplary fashion. The measurement beam output coupled in the forward direction strikes a telescope array 6 for reduced-size imaging on a first beam analysis system 8 via a beam manipulator 4 (including a pair of wedge prisms that are rotatable independently of one another).

In analogous fashion and with the same design, the measurement beam output coupled in the backward direction strikes a telescope array 7 for reduced-size imaging on a second beam analysis system 9 via a beam manipulator 5 (likewise including a pair of wedge prisms that are rotatable independently of one another).

The beam analysis systems 8 and 9 each have a wavefront sensor system, wherein these wavefront sensor systems preferably have the same design (e.g., both may have a grating shearing interferometer as described below).

Figure 2:
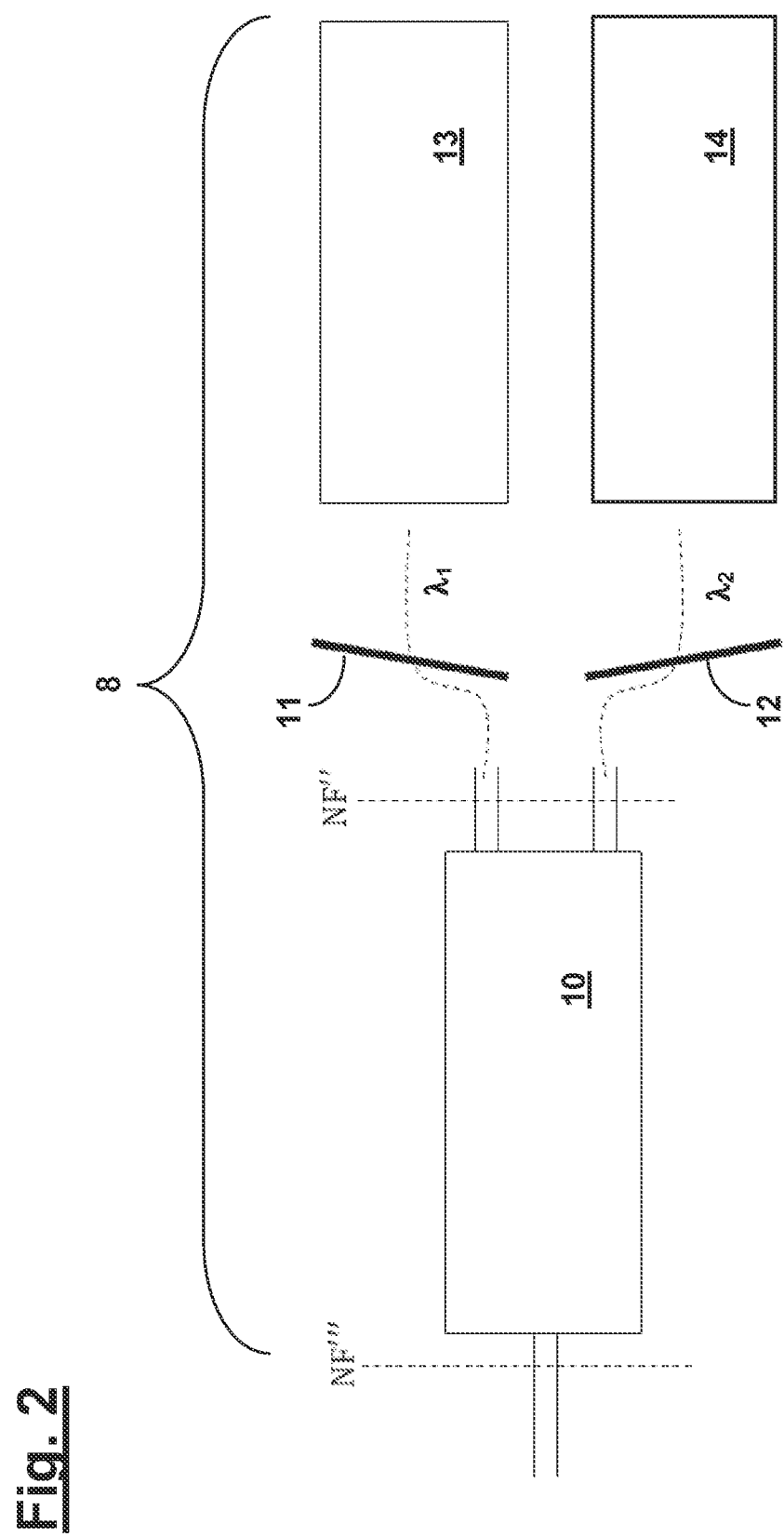
FIG. 2 shows a schematic illustration of the basic setup of a beam analysis system, which is designed to analyze both an excitation laser beam and a preconditioning laser beam, within the overall setup of the beam analysis of FIG. 1.

FIG. 2 shows a schematic illustration of the basic possible setup of the beam analysis system 8 from FIG. 1. In this case and in the following, near field planes are respectively denoted by NF, NF', NF" . . . and far field planes are respectively denoted by FF, FF', FF'' . . . Focal lengths are denoted by f,f'. Initially, the beam analysis system 8 includes a beam replication unit 10 (e.g., in the form of a beam replication telescope) with downstream wavelength filters 11, 12, by which the excitation laser beam (at a wavelength $\lambda_1$, which can be 10.6 µm, for example) and the preconditioning laser beam (at a wavelength $\lambda_2$, which can be 10.3 µm, for example) or the associated output coupled measurement beams are each fed via separate beam paths to a grating shearing interferometer, which is only illustrated as block 13 or 14 in FIG. 2 and which will be described in more detail below on the basis of different embodiments.

FIG. 4 shows a possible configuration of the grating shearing interferometer, used in exemplary fashion in the beam analysis systems 8 and 9, as a far field grating shearing interferometer 40. The latter initially includes a beam replication unit 41 with lenses 42, 43 and a first diffraction grating 44, which splits the incident beam into three replicated partial beams corresponding to the −1st, 0th and +1st order of diffraction. These three partial beams are incident on an optical group 45 which is embodied as a Kepler telescope and which includes, for example, a second diffraction grating 47 between Fourier optical units 46 and 48. This second diffraction grating 47 has three separate regions 47a-47c corresponding to the three partial beams. Of these, the regions 47a and 47b generate shearing interferograms in mutually perpendicular directions in a subsequent near field plane NF while the region 47c, as a transparent region, supplies a near field image in the near field plane NF. In this configuration, the beam information can be available in a form which facilitates a low-error reconstruction of the wavefront and the beam amplitude. However, an embodiment as a 2D shearing interferometer without explicit imaging of the near field is also conceivable, with the beam replication unit 41 becoming obsolete in this case.

Wedge-shaped prisms for providing a perpendicular light incidence for the nominal chief rays on an image sensor situated in the near field plane NF are denoted by "49a" and "49b".

Figures 5A, 5B, 5C:
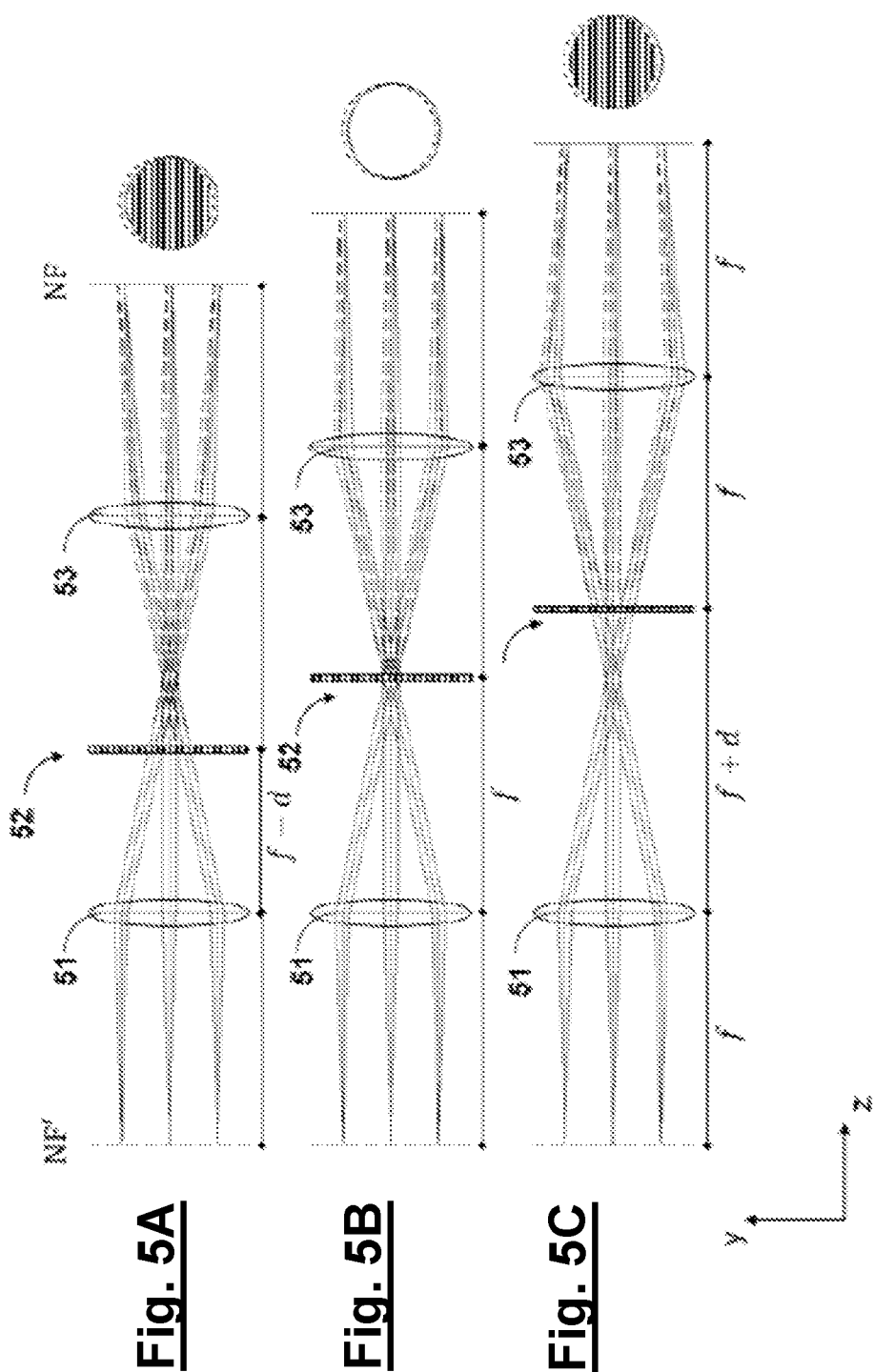
Figure 6:
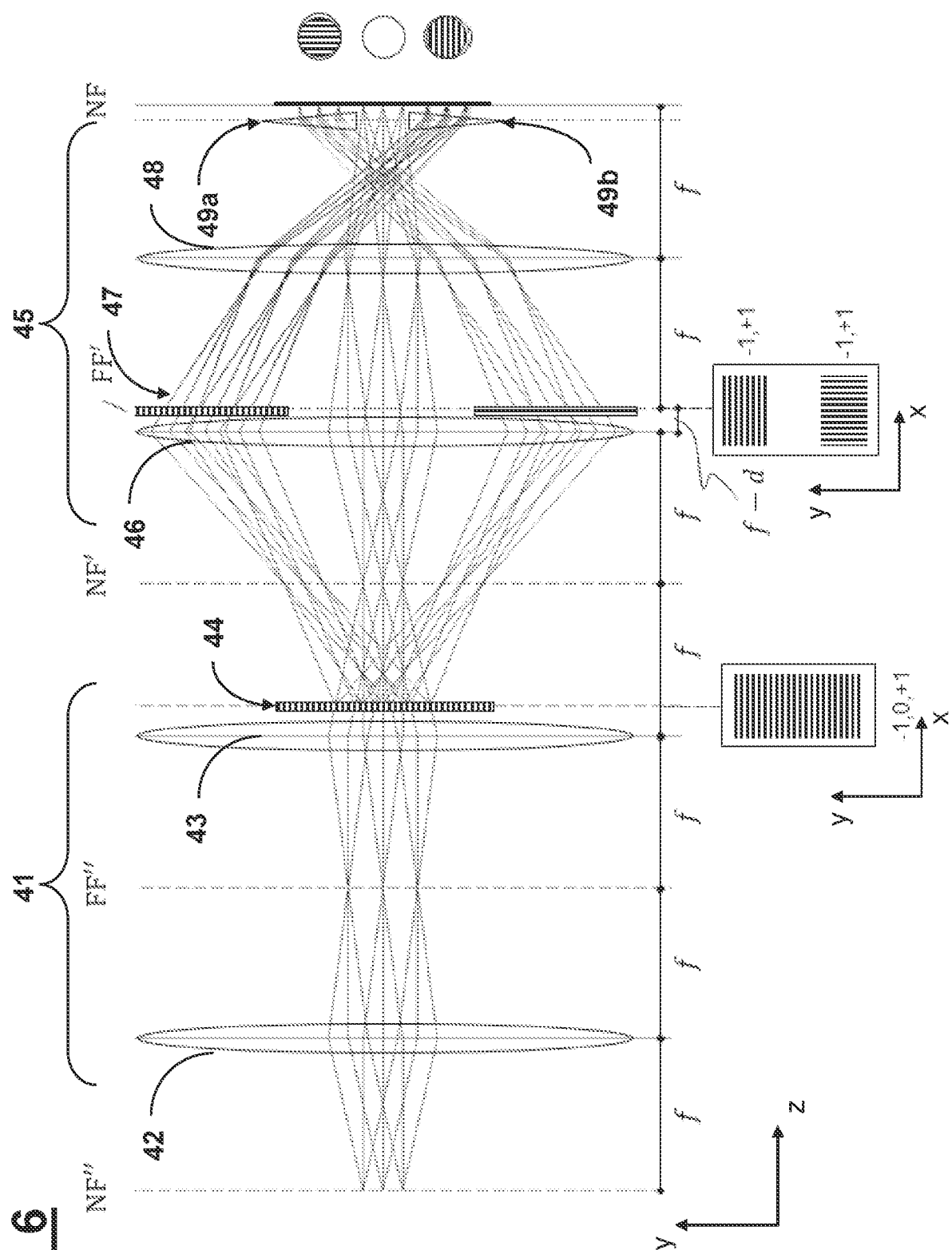

As indicated schematically in FIGS. 5a-5c, the provision of a spatial modulation carrier for generating the shearing interferograms or an evaluable line pattern is implemented by detuning of the Kepler telescope formed by the Fourier optical units (with these Fourier optical units being denoted by "51" and "53" in FIGS. 5a-5c and corresponding to the Fourier optical units 46 and 48 from FIG. 4). In FIGS. 5a-5c, which merely consider one optical channel, this is implemented by way of a displacement of the Fourier optical units 51, 53 with the focal length relative to one another through the distance d. According to FIG. 6, the optical group 45 embodied as a Kepler telescope is maximally detuned in accordance with this principle with the placement of the second diffraction grating 47 immediately downstream of the entry-side Fourier optical unit 46, as a consequence of which a maximum separation of the respective light tubes and hence a maximum measurement region with respect to beam divergence and beam propagation direction is achieved.

Figure 7:
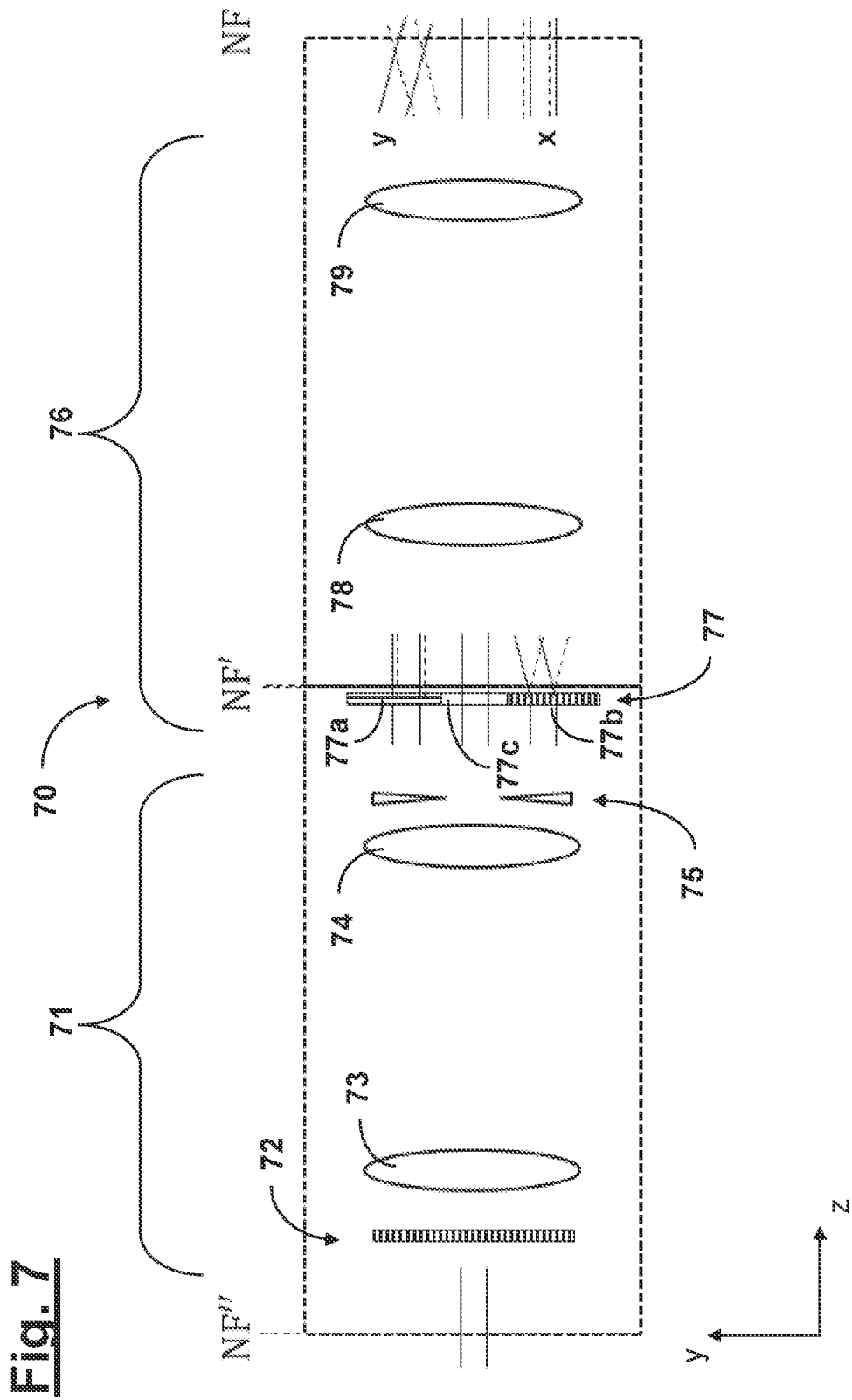
FIGS. 7-8 show schematic illustrations explaining setup and functionality of a grating shearing interferometer in the form of a near field grating shearing interferometer, as used in a beam analysis system according to the disclosure.
Figure 8:
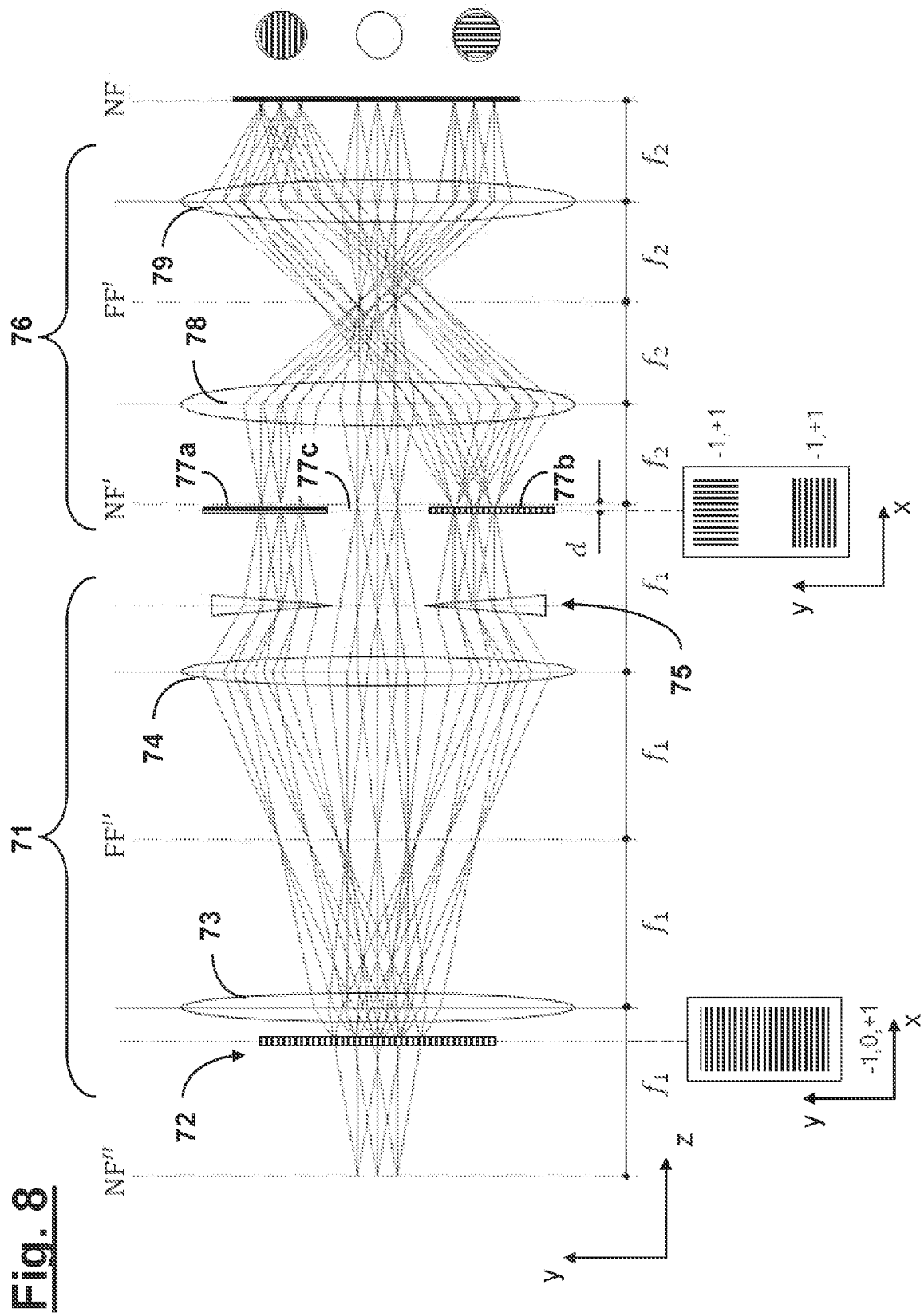

FIGS. 7-8 show schematic illustrations for explaining a further possible embodiment of the grating shearing interferometer, usable within the beam analysis systems 8 and 9 in exemplary fashion, in the form of a near field grating shearing interferometer.

This near field grating shearing interferometer 70 once again initially includes a beam replication unit 71 including a first diffraction grating 72, by which the incident beam is split into three replicated partial beams corresponding to the −1st, 0th and +1st order of diffraction in a manner analogous to the embodiments described above on the basis of FIGS. 4-6.

The diffraction grating 72 is followed by a replication telescope formed from Fourier optical units 73, 74, from which the corresponding partial beams are incident in perpendicular fashion via wedge-shaped prisms 75 on a second diffraction grating 77, which acts as a shearing grating, in a subsequent optical group 76. In a manner analogous to the embodiments described above on the basis of FIGS. 4-6, this second diffraction grating 77 has three separate regions 77a-77c, wherein the regions 77a, 77b serve to generate shearing interferograms in mutually perpendicular directions and wherein the region 77c, as a transparent region, serves to provide a near field image on a downstream image sensor. By way of a downstream 1:1 Kepler telescope made of Fourier optical units 78, 79, the near field plane NF' containing the second diffraction grating 77 is imaged on an image-side near field plane NF, in which the image sensor is placed. In FIG. 8, $f_1$ denotes the focal lengths within the beam replication unit 71 and $f_2$ denotes the focal lengths within the downstream 1:1 Kepler telescope.

It is also possible to dispense with the telescope in further embodiments, wherein the camera sensor can be arranged in a near field plane downstream of the shearing grating at a distance corresponding to a selected Talbot order. However, the use of a telescope can be desirable since the realization of such a small distance between image sensor and shearing grating may not be possible due to the design. Here, too, an embodiment of the second diffraction grating 77 as a 2D shearing interferometer without explicit imaging of the near field is also conceivable, with the beam replication unit 71 becoming obsolete in this case.

As is yet to be explained below, a reduction in the installation size can typically be achieved in the configuration described above as a near field grating shearing interferometer as a consequence of smaller lens diameters within the respective optical units (including beam replication units).

Figure 3:
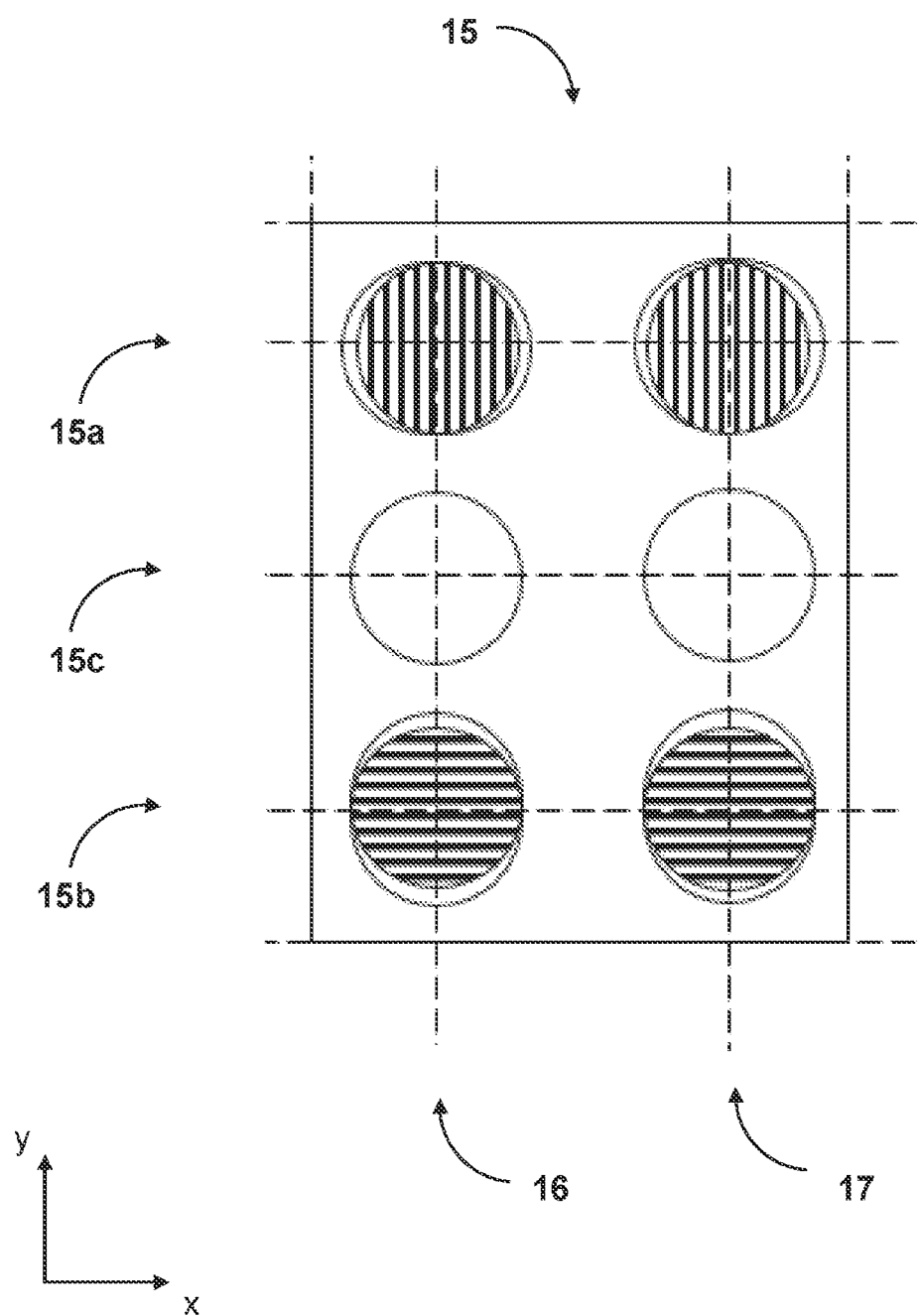
FIG. 3 shows a schematic illustration of a detector image generated according to the disclosure, the detector image having respective shearing interferograms in mutually perpendicular directions and a near field image both for the excitation laser beam and the pre-conditioning laser beam.

As a result, one and the same detector 15 or image sensor can be used in the beam analysis according to the disclosure to capture the shearing interferograms respectively recorded in mutually perpendicular directions as described above for both the excitation laser beam and the preconditioning laser beam and also the respectively recorded near field image such that measurement and evaluation errors accompanying the use of different optical components in the respective beam guides are avoided. FIG. 3 schematically shows such a detector image having respective shearing interferograms 15a, 15b in mutually perpendicular directions and, in each case, a near field image 15c both for the excitation laser beam (column 16) and the preconditioning laser beam (column 17).

Even though the disclosure has been described on the basis of specific embodiments, numerous variations and alternative embodiments will be apparent to a person skilled in the art, for example through combination and/or exchange of features of individual embodiments. Accordingly, it goes without saying for a person skilled in the art that such variations and alternative embodiments are encompassed by the present disclosure, and the scope of the disclosure is only restricted as provided by the appended patent claims and the equivalents thereof.

What is claimed is:

1. A metrology system configured to be used with an EUV plasma source in which an excitation laser beam is guided to a target material in a plasma ignition position, the metrology system comprising:
    a first beam analysis system configured to analyze a first measurement beam coupled from the excitation laser beam before the excitation laser beam interacts with the target material; and
    a second beam analysis system configured to analyze a second measurement beam coupled from the excitation laser beam after the excitation laser beam interacts with the target material,
    wherein:
      the first beam analysis system comprises a first wavefront sensor system; and
      the second beam analysis system comprises a second wavefront sensor system.

2. The metrology system of claim 1, wherein:
    the first beam analysis system is configured to analyze a preconditioning laser beam in the EUV plasma source;
    the second beam analysis system is configured to analyze the preconditioning laser beam in the EUV plasma source; and
    the preconditioning laser beam is guided to the target material before the target material is in the plasma ignition position.

3. The metrology system of claim 2, wherein:
    the first wavefront sensor system comprises a first beam replication unit and wavelength filters downstream of the first beam replication unit to separate the excitation laser beam and the preconditioning laser beam from each another;
    the second wavefront sensor system comprises a second beam replication unit and wavelength filters downstream of the second beam replication unit to separate the excitation laser beam and the preconditioning laser beam from each another.

4. The metrology system of claim 3, wherein:
    the first wavefront sensor system comprises a first single detector to capture both the excitation laser beam and the preconditioning laser beam; and
    the second wavefront sensor system comprises a second single detector to capture both the excitation laser beam and the preconditioning laser beam.

5. The metrology system of claim 2, wherein:

the first wavefront sensor system comprises a first single detector to capture both the excitation laser beam and the preconditioning laser beam; and the second wavefront sensor system comprises a second single detector to capture both the excitation laser beam and the preconditioning laser beam.

6. The metrology system of claim 1, wherein:

the first wavefront sensor system comprises a first grating shearing interferometer; and the second wavefront sensor system comprises a second grating shearing interferometer.

7. The metrology system of claim 6, wherein:

the first grating shearing interferometer comprises a first beam replication unit which comprises a first diffraction grating and a second diffraction grating, the second diffraction grating being a shearing grating; and the second grating shearing interferometer comprises a second beam replication unit which comprises a first diffraction grating and a second diffraction grating, the second diffraction grating being a shearing grating.

8. The metrology system of claim 7, wherein:

the shearing grating of the first beam replication unit is configured to generate shearing interferograms in mutually perpendicular directions on a first downstream detector; and the shearing grating of the second beam replication unit is configured to generate shearing interferograms in mutually perpendicular directions on a second downstream detector.

9. The metrology system of claim 8, wherein:

the shearing grating of the first beam replication unit comprises a transparent region configured to generate a near field image on the first downstream detector; and the shearing grating of the second beam replication unit comprises a transparent region configured to generate a near field image on the second downstream detector.

10. The metrology system of claim 7, wherein:

the shearing grating of the first beam replication unit comprises a transparent region configured to generate a near field image on the first downstream detector; and the shearing grating of the second beam replication unit comprises a transparent region configured to generate a near field image on the second downstream detector.

11. The metrology system of claim 6, wherein the first grating shearing interferometer comprises a first far field grating shearing interferometer.

12. The metrology system of claim 11, wherein the second grating shearing interferometer comprises a second far field grating shearing interferometer.

13. The metrology system of claim 6, wherein the first grating shearing interferometer comprises a first near field grating shearing interferometer.

14. The metrology system of claim 13, wherein the second grating shearing interferometer comprises a second near field grating shearing interferometer.

15. The metrology system of claim 1, wherein the first and second beam analysis systems have the same design.

16. The metrology system of claim 1, wherein the excitation laser beam comprises an infrared laser beam.

17. The metrology system of claim 1, wherein the excitation laser beam is in an EUV plasma source, and the excitation laser beam is generated by an excitation laser.

* * * * *

UNITED STATES PATENT AND TRADEMARK OFFICE
CERTIFICATE OF CORRECTION

| | | |
|---|---|---|
| PATENT NO. | : 11,920,977 B2 | Page 1 of 1 |
| APPLICATION NO. | : 17/192012 | |
| DATED | : March 5, 2024 | |
| INVENTOR(S) | : Matthias Manger and Florian Baumer | |

It is certified that error appears in the above-identified patent and that said Letters Patent is hereby corrected as shown below:

In the Specification

Column 1, Line 9, delete "USC" insert -- U.S.C. --.

Column 1, Line 11, delete "USC" insert -- U.S.C. --.

Column 5, Line 37, delete "pre-conditioning" insert -- preconditioning --.

Column 6, Line 26-37, delete "FF', FF...Focal lengths are denoted by $f, f'$. Initially, the beam analysis system 8 includes a beam replication unit 10 (e.g., in the form of a beam replication telescope) with downstream wavelength filters 11, 12, by which the excitation laser beam (at a wavelength $\lambda 1$, which can be 10.6 µm, for example) and the preconditioning laser beam (at a wavelength $\lambda 2$, which can be 10.3 µm, for example) or the associated output coupled measurement beams are each fed via separate beam paths to a grating shearing interferometer, which is only illustrated as block 13 or 14 in FIG. 2 and which will be described in more detail below on the basis of different embodiments." and insert the same on Column 6, Line 25, as a continuation of the same paragraph.

Signed and Sealed this
Seventh Day of May, 2024

Katherine Kelly Vidal
*Director of the United States Patent and Trademark Office*